(12) United States Patent
Wadahara et al.

(10) Patent No.: US 6,998,434 B2
(45) Date of Patent: Feb. 14, 2006

(54) CARBON FIBER REINFORCED RESIN COMPOSITION, MOLDING COMPOUNDS AND MOLDED PRODUCTS THEREFROM

(75) Inventors: Eisuke Wadahara, Iyo-gun (JP); Masato Honma, Matsuyama (JP); Soichi Ishibashi, Matsuyama (JP); Yasunori Nagashima, Iyo-gun (JP); Yuji Kojima, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 140 days.

(21) Appl. No.: 10/470,975

(22) PCT Filed: Feb. 1, 2002

(86) PCT No.: PCT/JP02/00847

§ 371 (c)(1),
(2), (4) Date: Aug. 4, 2003

(87) PCT Pub. No.: WO02/062899

PCT Pub. Date: Aug. 15, 2002

(65) Prior Publication Data

US 2004/0077771 A1    Apr. 22, 2004

(30) Foreign Application Priority Data

Feb. 5, 2001 (JP) .............................. 2001-028179
Feb. 9, 2001 (JP) .............................. 2001-033462
Feb. 9, 2001 (JP) .............................. 2001-033463

(51) Int. Cl.
C08K 7/02 (2006.01)
C08K 7/22 (2006.01)

(52) U.S. Cl. .................. 524/495; 252/500; 428/297.4; 428/411.1; 428/430

(58) Field of Classification Search ................ 524/495, 524/80; 252/609, 500; 428/297.4, 411.1, 428/430
See application file for complete search history.

(56) References Cited

U.S. PATENT DOCUMENTS

2002/0086198 A1 * 7/2002 Ilno et al. ..................... 429/34

FOREIGN PATENT DOCUMENTS

JP 3-81370 4/1991
JP 5-32819 2/1993

(Continued)

OTHER PUBLICATIONS

International Search Report mailed Apr. 23, 2002.

Primary Examiner—Tatyana Zalukaeva
Assistant Examiner—Satya B. Sastri
(74) Attorney, Agent, or Firm—Morrison & Foerster LLP

(57) ABSTRACT

The present invention relates to carbon fiber reinforced resin compositions comprising the following essential components (A), (B) and (C), and to molding compounds and molded products made by processing and molding the carbon fiber reinforced resin composition; Component (A): 0.01 to 0.7% by weight of vapor grown carbon fiber and/or nanotubes based on 100% by weight of the carbon fiber reinforced resin composition, of which the average diameter of single fiber ranges from 1 to 45 nm; Component (B): 6 to 40% by weight of carbon fiber based on 100% by weight of the carbon fiber reinforced resin composition, of which the average diameter of single fiber ranges from 1 to 20 μm; and Component (C): resin. The present invention provides carbon fiber reinforced resin composition, molding compounds and molded products therefrom, having good conductivity, mechanical properties and moldability by the above constitution.

21 Claims, 4 Drawing Sheets

FOREIGN PATENT DOCUMENTS

| | | |
|---|---|---|
| JP | 8-239513 | 9/1996 |
| JP | 2001-151833 | 6/2001 |
| JP | 2002-60639 | 2/2002 |
| JP | 2002-97375 | 4/2002 |
| JP | 2002-105329 | 4/2002 |
| WO | WO 9738051 A1 * | 10/1997 |

* cited by examiner

CARBON FIBER REINFORCED RESIN COMPOSITION, MOLDING COMPOUNDS AND MOLDED PRODUCTS THEREFROM

FIELD OF THE INVENTION

The present invention relates to carbon fiber reinforced resin compositions, molding compounds and molded products therefrom, having good conductivity, mechanical properties and moldability.

BACKGROUND OF THE INVENTION

Resin compositions having desired conductivity by blending resin with conductive materials (e.g. carbon fibers) are known. Recently, various attempts have been made, such as increase in amount of blended conductive materials, use of particular conductive materials, combination of several conductive materials and the like, to achieve higher conductivity.

The increase in amount of blended conductive materials to achieve higher conductivity, however, gave rise to some problems in many cases such as high viscosity of the composition, large curtailment of mechanical properties, such as impact strength, deterioration of outer surface appearance of the molded products and the like.

One example of the use of particular conductive materials is blending resin with vapor grown carbon fiber, a nanotube and the like. Such technologies were disclosed in, for example, Japanese Patent Laid-open No. (Hei) 7-102112 and WO-2000-050514. However, these particular conductive materials are very expensive. Furthermore, considerable amount of these materials must be blended to achieve high conductivity with these materials alone. Accordingly, the price of the resin composition becomes expensive.

One example of the combination of several conductive materials is to combine carbon black with conductive fiber. Such technologies were disclosed in, for example, U.S. Pat. No. 4,604,413 and Japanese Patent Laid-open No. (Hei) 6-240049. These technologies can increase conductivity of conventional resin to some degree but deteriorates moldability (for example, flowability when molding) and mechanical properties. Therefore, they could not satisfy high conductivity and moldability simultaneously.

Another example of the combination of several conductive materials is to combine carbon fiber with particular small diameter carbon fiber (e.g. vapor grown carbon fiber). Such technologies were disclosed in, for example, U.S. Pat. No. 5,643,502 and Japanese Patent Laid-open No. 2000-44815. According to the above publications, however, it was found that some resin compositions having certain ratio of carbon fiber and small diameter carbon fiber does not increase conductivity and, in some cases, even lowers conductivity. Thus, it is clear that the above technologies cannot give good results.

Carbon fiber reinforced resin compositions are frequently used for various member of electronic devices, such as personal computers, office automation devices, AV devices, mobile phones, telephones, facsimile machines, household appliances, toys and the like because of their high shielding property against electromagnetic waves and good mechanical properties. Recently, with the development of portable devices, the thickness of the casing as well as the inner parts of the devices have to be small, which results in strong requirements for conductivity, mechanical properties, and moldability. Therefore, deterioration of such characteristic features becomes critical.

Given the above technologies, it was impossible to prepare carbon fiber reinforced resin composition, molding compounds and molded products therefrom that had high conductivity, show high shielding property against electromagnetic waves and satisfy moldability such as flowability when molding and ease of molding.

Purpose of the Invention

The present invention is intended to provide carbon fiber reinforced resin compositions, molding compounds and molded products therefrom, having good conductivity, mechanical properties and moldability, beyond the above conventional technologies.

Disclosure of the Invention

The present invention is based on investigation to solve problems in conventional technologies and the finding that carbon fiber reinforced resin compositions made by blending carbon fiber with particular small diameter carbon fiber in a specific ratio produces good results.

The carbon fiber reinforced resin compositions of the present invention have the following essential components:

Component (A): 0.01 to 0.7% by weight of vapor grown carbon fiber and/or nanotubes based on 100% by weight of the carbon fiber reinforced resin composition, of which the average diameter of single fiber ranges from 1 to 45 nm;

Component (B): 6 to 40% by weight of carbon fiber based on 100% by weight of the carbon fiber reinforced resin composition, of which the average diameter of single fiber ranges from 1 to 20 $\mu$m; and Component (C): resin.

The molding compounds and the molded products of the present invention are characterized in that they are made by processing and molding said carbon fiber reinforced resin composition.

BRIEF DESCRIPTIONS OF THE DRAWINGS

DESCRIPTIONS OF FIGURE REFERENCES

Figure 1:
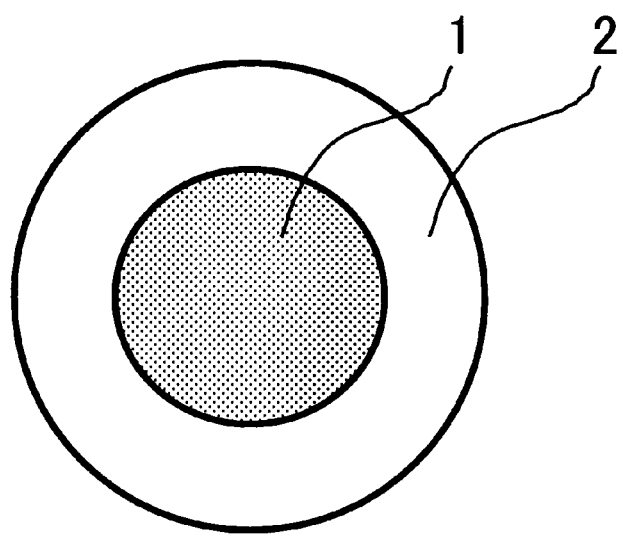
FIG. 1 is a cross-sectional view of an example configuration of the molding compounds according to the present invention.
Figure 2:
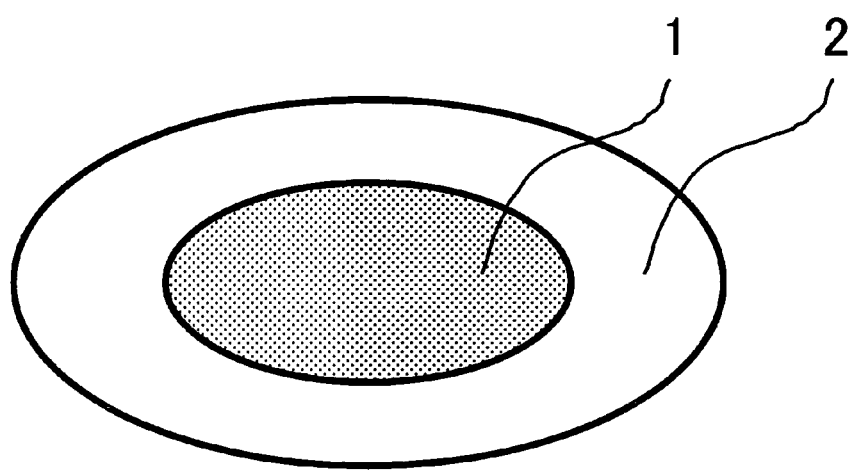
FIG. 2 is a cross-sectional view of another example configuration of the molding compounds according to the present invention that is different from the example of FIG. 1.
Figure 3:
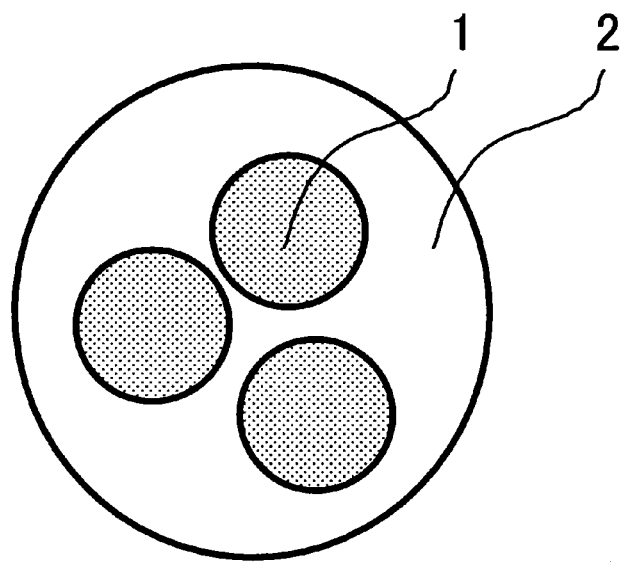
FIG. 3 is a cross-sectional view of another example configuration of the molding compounds according to the present invention that is different from the example of FIG. 1.
Figure 4:
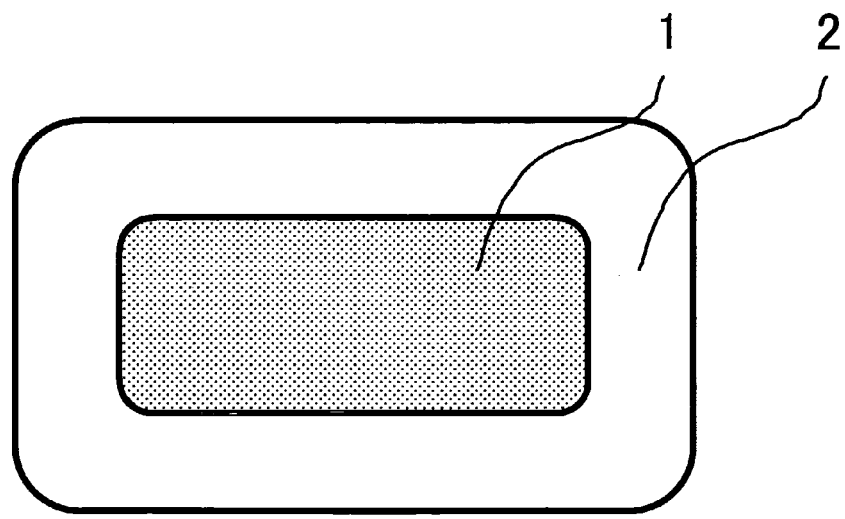
FIG. 4 is a cross-sectional view of another example configuration of the molding compounds according to the present invention that is different from the example of FIG. 1.
Figure 5:
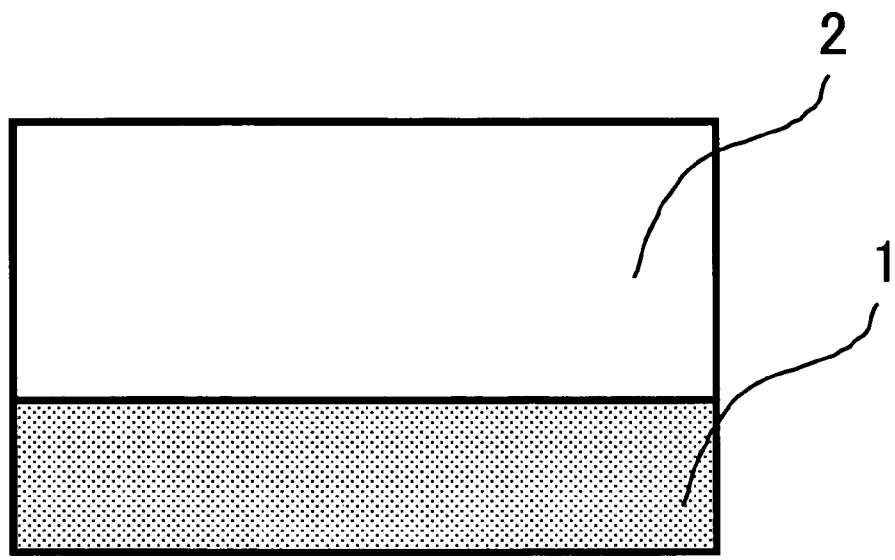
FIG. 5 is a cross-sectional view of another example configuration of the molding compounds according to the present invention that is different from the example of FIG. 1.
Figure 6:
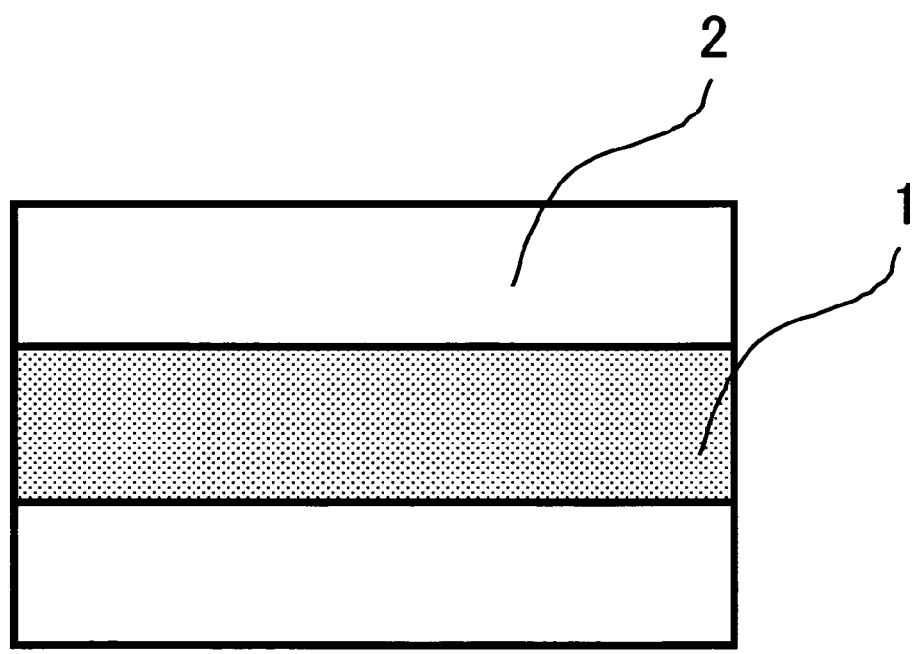
FIG. 6 is a cross-sectional view of another example configuration of the molding compounds according to the present invention that is different from the example of FIG. 1.

1: Structure B containing component (B) as a main component
2: Structure A containing component (C) as a main component
3: Model casing for electronic devices
4: Top surface
5: Weld line
6: Measurement range of outer surface appearance
L: Length
W: Width
H: Height Preferred Embodiments of the Present Invention The preferred embodiments of the carbon fiber reinforced resin composition of the present invention will be specifically explained below.

The carbon fiber reinforced resin composition of the present invention is comprised of at least following components (A), (B) and (C):

Component (A): 0.01 to 0.7% by weight of vapor grown carbon fiber and/or nanotubes based on 100% by weight of the carbon fiber reinforced resin composition, of which the average diameter of single fiber ranges from 1 to 45 nm;

Component (B): 6 to 40% by weight of carbon fiber based on 100% by weight of the carbon fiber reinforced resin composition, of which the average diameter of single fiber ranges from 1 to 20 $\mu$m; and Component (C): resin.

Component (A) of the present invention defines carbon fiber or graphite fiber which is generally discontinuous and obtained by a vapor deposition method which grows crystal in the vapor phase and/or single-layer or multi-layer nanotubes obtained by a vapor deposition method, arc discharge method, laser evaporation method and the like. These can be any shape such as a needle, a coil and a tube. Additionally, at least two of these can be blended. A process for preparing component (A) was disclosed in U.S. Pat. No. 5,643,502, but is not limited thereto.

Shinohara et al. reported usage of powdery Y-type zeolite supported cobalt and vanadium in a process for preparing multi-layer nanotubes by vapor deposition method (Chemical Physics Letters, 303:117–124, 1999). This is useful for preparing a cheap, narrow and good nanotube.

Plasma treatment can be performed to increase dispersity and ease in handling of the nanotube. An example of a plasma treatment is low temperature plasma treatment that is known in the art, although not limited thereto. This is a process whereby a nanotube and a treating gas are placed in plasma treating area and then treating the nanotube with plasma generated by application of high voltage. Examples of treating gases include organic or inorganic gases although not limited thereto, such as oxygen, nitrogen, hydrogen, ammonia, methane, ethylene, tetrafluorocarbon, and mixture thereof Oxygen gas plasma treatment is particularly preferred to improve the handling ease of a nanotube.

The average diameter of single fiber of component (A) is in the range of 1 to 45 nm, preferably 5 to 35 nm, more preferably 7 to 30 nm, and particularly preferably 9 to 25 nm. If the average diameter of single fiber is less than 1 nm, it is sometimes difficult to prepare in the fiber form. On the other hand, if the average diameter of single fiber is more than 45 nm, it is sometimes impossible to get specifically desired conductivity.

Average aspect ratio of component (A) preferably ranges from 1 to 10000 and particularly from 20 to 5000, because conductivity increases effectively at these ranges.

The preferable amount of component (A) ranges from 0.01 to 0.7% by weight based on 100% by weight of the carbon fiber reinforced resin composition. It ranges more preferably from 0.05 to 0.6% by weight, particularly preferably from 0.1 to 0.45% by weight and most preferably from 0.15 to 0.35% by weight. If the amount of component (A) is less than 0.01% by weight, it is sometimes impossible to get desired conductivity. On the other hand, if the amount of component (A) is more than 0.7% by weight, the flowability of the carbon fiber reinforced resin composition deteriorates extremely, which sometimes results in lower conductivity than the conductivity of the resin composition of component (B) alone without component (A). The deterioration of flowability curtails moldability, which is avoided by the present invention, and also accelerates cut or breakage of component (B), thereby remarkably degrading the mechanical properties or impairing outer surface appearance, for example uneven defects in the surface of the molded products. These phenomena are critical shortcoming in member for electronic devices.

Component (B) of the present invention defines carbon fiber or graphite fiber made from PANs, pitches and the like; metal-coated carbon fiber made by coating the above carbon fiber or graphite fiber with at least one layer of metal such as nickel, ytterbium, gold, silver, copper and the like using plating (electrolysis or electroless), CVD, PVD, ion plating, vapor deposition and the like; and a combination of at least two thereof. When at least two of the above are combined, carbon fiber can be combined with fiber other than carbon fiber such as glass fiber or aramid fiber. PAN type carbon fiber is preferable for such carbon fiber because it has good balance between price and mechanical properties such as strength and modulus.

Carbon fiber with crystalline size measured by wide-angle X-ray diffraction (hereinafter, referred to as "Lc") to be in the range of 1 to 6 nm is preferable for the carbon fiber used in the present invention. If the crystalline size is less than 1 nm, the conductivity of the carbon fiber is low, because carbonization or graphitization of the carbon fiber is not sufficient. Therefore, the conductivity of the molded products will also be low. On the other hand, if the crystalline size is more than 6 nm, the carbon fiber is weak and easy to break although the carbonization or graphitization of the carbon fiber is sufficient and so the conductivity of the carbon fiber itself is good. Consequently, the length of the carbon fiber in the molded products is short, and, thus, good conductivity of the molded products cannot be expected. The crystalline size ranges more preferably from 1.3 to 4.5 nm, particularly preferably from 1.6 to 3.5 nm, and most preferably from 1.8 to 2.8 nm. Measurement of Lc by wide-angle X-ray diffraction was performed according to the method described in available reference materials (Japan Society for the promotion of science, panel 117, carbon, 36, p 25 (1963)).

The average diameter of a single fiber of component (B) is in the range of 1 to 20 $\mu$m. The diameter preferably ranges from 4 to 15 $\mu$m, more preferably from 5 to 11 $\mu$m, and particularly preferably from 6 to 8 $\mu$m. If the average diameter of a single fiber is less than 1 $\mu$m, it is sometimes impossible to obtain the desired mechanical properties. On the other hand, if the average diameter of a single fiber is more than 20 $\mu$m, it is sometimes impossible to obtain the particularly desired conductivity.

The amount of component (B) ranges preferably from 6 to 40% by weight, more preferably from 8 to 37% by weight, particularly preferably from 12 to 35% by weight and most preferably from 17 to 32% by weight. If the amount of component (B) is less than 6% by weight, it is sometimes impossible to get specifically desired conductivity or mechanical properties. On the other hand, if the amount of the component (B) is more than 40% by weight, moldability becomes bad because flowability when molding deteriorates, and the outer surface appearance of the molded products also deteriorates.

Any thermosetting resin or thermoplastic resin can be used for component (C) of the present invention. Thermoplastic resin is more preferable because the impact strength of the molded products therefrom is good and the molded products can be made by effective molding process such as press molding and injection molding.

The thermosetting resin includes, for instance, unsaturated polyester, vinyl ester, epoxy, phenol (resol type), urea.melamine, polyimide and the like, copolymers, modifications, and combinations thereof. Moreover, elastomer or rubber can be added to the above thermosetting resin to improve the impact strength.

The thermoplastic resin includes, for instance, polyesters such as polyethylene terephthalate (PET), polybutylene terephthalate (PBT), polytrimethylene terephthalate (PTT), polyethylene naphthalate (PEN), liquid crystalline polyester and the like; polyolefines such as polyethylene (PE), polypropylene (PP), polybutylene and the like; styrenic resin; polyoxymethylene (POM); polyamide (PA); polycarbonate (PC); polymethylenemethacrylate (PMMA); polyvinyl chloride (PVC); poly(phenylenesulfide) (PPS); polyphenylene ether (PPE); modified PPE; polyimide (PI); polyamideimide (PAI); polyetherimide (PEI); polysulfone (PSU); polyethersulfone; polyketone (PK); polyetherketone (PEK); polyetheretherketone (PEEK); polyetherketoneketone (PEKK); polyarylate (PAR); polyethernitrile (PEN); phenolic resin; phenoxy resin; fluorinated resin such as polytetrafluoroethylene; thermoplastic elastomers such as polystyrene type, polyolefin type, polyurethane type, polyester type, polyamide type, polybutadiene type, polyisoprene type, fluoro type and the like; copolymers thereof; modifications thereof; and combinations thereof. Moreover, other elastomer or rubber can be added to the above thermoplastic resin to improve the impact strength.

From the aspect of moldability, economical efficiency, mechanical properties and heat resistance, at least one thermoplastic resin selected from the group consisting of polyamide resin, styrenic resin, polycarbonate resin, polyphenylene ether resin, polyester resin, poly (phenylene sulfide) resin, polyolefin resin, liquid crystal resin, phenolic resin and elastomer is preferable. At least one thermoplastic resin selected from the group consisting of polyamide resin, polycarbonate resin, styrenic resin and polyester resin is particularly preferable. Particularly, if phenolic resin is jointly used, improvements in moldability can be achieved.

The polyamide resin is a polymer with main components comprised of amino acid, lactam or diamine and dicarboxylic acid. The specific examples are amino acids such as 6-aminocaproic acid, 11-aminoundecanoic acid, 12-aminododecanoic acid, p-aminomethylbenzoic acid and the like; lactams such as ε-caprolactam, ω-laurolactam and the like; aliphatic, alicyclic or aromatic diamines such as tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, metaxylylenediamine, paraxylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine and the like; aliphatic, alicyclic or aromatic dicarboxylic acid such as adipic acid, suberic acid, azelaic acid, sebacic acid, dodecanoic diacid, terephthalic acid, isophthalic acid, 2-chloroterephthalic acid, 2-methylterephthalic acid, 5-methylisophthalic acid, 5-sodium-sulfoisophthalic acid, 2,6-naphthalene dicarboxylic acid, hexahydroterephthalic acid, hexahydroisophthalic acid and the like; and homopolymers or copolymer derived therefrom.

The specific examples of useful polyamide resins are polycaproamide (Nylon 6), polyhexamethyleneadipamide (Nylon 66), polytetramethyleneadipamide (Nylon 46), polyhexamethylenesebacamide (Nylon 610), polyhexamethylenedodecamide (Nylon 612), polyundecaneamide, polydodecaneamide, hexamethyleneadipamide/caproamide copolymer (Nylon 66/6), caproamide/hexamethyleneterephthalamide copolymer (Nylon 6/6T), hexamethyleneadipamide/hexamethyleneterephthalamide copolymer (Nylon 66/6T) hexamethyleneadipamide/hexamethyleneisophthalamide copolymer (Nylon 66/6I), hexamethyleneadipamide/hexamethyleneisophthalamide/caproamide copolymer (Nylon 66/6I/6), hexamethyleneadipamide/hexamethyleneterephthalamid/carpoamide copolymer (Nylon 66/6T/6), hexamethyleneterephthalamide/hexamethyleneisophthalamide copolymer (Nylon 6T/6I), hexamethyleneterephthalamide/dodecanamide copolymer (Nylon 6T/12), hexamethyleneadipamide/hexamethyleneterephthalamide/hexamethyleneisophthalamide copolymer (Nylon 66/6T/6I), polyxylyleneadipamide, hexamethyleneterephthalamide/2-methylpentamethyleneterephthalamide copolymer, polymetaxylylenediamineadipamide (Nylon MXD6), polynonamethyleneterephthalamide (Nylon 9T) and mixtures thereof.

Particularly, if polyamide resin with melting temperature equal to or above 150° C. is used, good modulus, impact strength, heat resistance or chemical resistance can be obtained. When polyamide is used for production of member for electronic devices, however, polyamide copolymer resin is preferable because it enables production of molded products having complex shape with large projected area and small thickness with relatively cheap molding process such as injection molding. Among these, the following polyamide resins are particularly preferable.

Nylon 66/6I/6 copolymer comprising at least (pa1) hexamethylenediamineadipamide unit, (pa2) hexamethyleneisophthalamide unit and (pa3) carpoamide unit is preferably used. The preferred ratio of the amounts of those units is as follows: component (pa1) being in the range of 60 to 90% by weight and particularly 70 to 85% by weight; component (pa2) being in the range of 1 to 30% by weight and particularly 10 to 20% by weight; and component (pa3) being in the range of 1 to 10% by weight and particularly 3 to 8% by weight. The preferred ratio of (pa2)/(pa3) by weight ranges from 1 to 30 and particularly 1.5 to 20. If such preferred polyamide resins are used, the results are good conductivity, smoothness in the welding portion (weld line) at which the resins are contacted with one another when molding the composition, and good mechanical properties (especially, modulus) under moisturized condition.

The smoothness of the welding portion is desired for increased productivity and economical efficiency when producing molded products such as member for electronic devices. The good mechanical properties under moisturized condition are desired for practical strength when the molded products are used under adverse conditions such as high temperature and high humidity.

The preferred standard of the molecular weight of the polyamide resins in view of moldability is relative viscosity, and relative viscosity measured in sulfuric acid of 1% concentration at 25° C. is from 1.5 to 2.5 and preferably from 2.0 to 2.3, although not particularly limited thereto.

The polyamide copolymer resins are preferably used as main component of component (C). However, it can be combined with other polyamide resins according to particular demand.

According to the need for improvement of characteristic features such as impact resistance, one or more selected from the group consisting of maleic anhydride modified olefin polymers; styrenic copolymers such as ABS and ASA; and elastomers such as polyesterpolyether elastomer and polyesterpolyester elastomer can be added to the polyamide resins.

The styrenic resins used in the present invention include a unit generated from styrene and/or derivatives thereof (sometimes referred to as aromatic vinyl monomers, as a whole).

Such styrenic resins include styrenic (co)polymer and rubber reinforced styrenic (co)polymer. The styrenic (co) polymer includes polymer generated from one or more aromatic vinyl monomers, and copolymer generated from one or more aromatic vinyl monomers and one or more monomers that are copolymerizable with the aromatic vinyl monomers. The rubber reinforced styrenic (co)polymer includes (co)polymer comprising styrene monomer grafted to the rubbery polymer and (co)polymer comprising styrene monomer not grafted to the rubbery polymer.

The preferred styrenic resin of the present invention includes styrenic polymer such as PS (polystyrene), rubber reinforced styrenic polymer such as HIPS (high-impact polystyrene), styrenic copolymer such as AS (acrylonitrile/styrene copolymer), rubber reinforced styrenic copolymer such as AES (acrylonitrile/ethylene propylene unconjugated diene rubber/styrene copolymer), ABS (acrylonitrile/butadiene/styrene copolymer), MBS (methyl methacrylate/butadiene/styrene copolymer), ASA (acrylonitrile/styrene/acrylic rubber copolymer). Among these, styrenic resin such as PS (polystyrene), styrenic copolymer such as AS (acrylonitrile/styrene copolymer), ABS (acrylonitrile/butadiene/styrene copolymer) and ASA (acrylonitrile/styrene/acrylic rubber copolymer) are more preferable.

The polycarbonate resin used in the present invention includes aromatic polycarbonate, aliphatic polycarbonate, alicyclic polycarbonate and aromatic-aliphatic polycarbonate. Among these, aromatic polycarbonate is preferable.

The aromatic polycarbonate resin is polymer or copolymer obtained by reacting carbonate precursor with aromatic hydroxy compound or small amount of polyhydroxy compound and the aromatic hydroxy compound. The method for producing aromatic polycarbonate resin is not particularly limited and includes the widely known phosgene method and transesterfication method.

The aromatic hydroxy compound includes 2,2-bis(4-hydroxyphenyl)propane (generally called as bisphenol A), 2,2-bis(4-hydroxyphenyl)methane, 1,1-bis(4-hydroxyphenyl)ethane, 1,1-bis(4-hydroxyphenyl)cyclohexane, 2,2-bis(4-hydroxy-3,5-dimethylphenyl)propane, 2,2-bis(4-hydroxy-3,5-dibromophenyl)propane, 2,2-bis (hydroxy-3-methylphneyl)propane, bis(4-hydroxyphenyl)sulfide, bis(4-hydroxy-phenyl)sulfone, hydroquinone, resorcinol, 4,6-dimethyl-2,4,6-tri(4-hydroxyphenyl) heptene, 2,4,6-dimethyl-2,4,6-tri(4-hydroxyphenyl)heptane, 2,6-dimethyl-2,4,6-tri(4-hydroxyphenyl)heptene, 1,3,5-tri(4-hydroxyphneyl)benzene, 1,1,1-tri(4-hydroxyphenyl) ethane, 3,3-bis(4-hydroxyaryl)oxyindole, 5-chloro-3,3-bis(4-hydroxyaryl)oxyindole, 5,7-dichloro-3,3-bis(4-hydroxyaryl) oxyindole, 5-brome-3,3-bis(4-hydroxyaryl) oxyindole and the like. Two or more of these can be combined. Among these, bis(4-hydroxyphenyl)alkane is preferable, and bisphenol A is particularly preferable.

In order to provide flame retardancy, the aromatic dihydroxy compound to which is bonded at least one sulfonic acid tetraalkylphosphonium or an oligomer or polymer having a siloxane structure, containing a phenolic hydroxy group at both ends can be used.

For the carbonate precursor, carbonylhalide, carbonate ester or haloformate and the like can be used. Specifically, phosgene, diphenylcarbonate and the like can be used.

The molecular weight of the polycarbonate resin ranges preferably from 14,000 to 30,000, more preferably from 15,000 to 28,000, and particularly preferably from 16,000 to 26,000 measured by viscosity average molecular weight in view of mechanical properties of the molded products and moldability. Wherein, the viscosity average molecular weight is calculated from the solution viscosity measured at a temperature of 25° C. using a 0.7 g carbonate resin solution in 100 ml of methylene chloride.

The modified polyphenylene resin used in the present invention is a polymer containing a unit structure of the chemical formula below (wherein, $R_1$ is a C1–C3 lower alkyl, and $R_2$ and $R_3$ are each hydrogen or a $C_1$–$C_3$ lower alkyl) in a main chain. Any homopolymer, copolymer or graft polymer can be used.

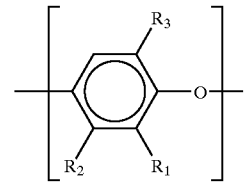

Specifically, poly(2,6-dimethyl-1,4-phenylene)ether, poly(2,6-diethyl-1,4-pheneylene)ether, poly(2,6-dipropyl-1,4-phenylene)ether and poly(2-methyl-6-ethyl-1,4-phenylene) ether and the like can be used. Among these, poly(2,6-dimethyl-1,4-pheneylene) ether, 2,6-dimethylphenol, 2,3,6-trimethylphenol copolymer and graft copolymer thereof to which styrene is grafted are preferable.

There is no particular limitation to the method of modifying polyphenylenether. Well-known modification methods, such as melting and blending polyphenylenether resin with unsaturated aliphatic carboxylic acid or anhydride thereof, can be used.

The polyester resin used in the present invention includes polycondensation products of dicarboxylic acid and glycol, ring-opened polymer of cyclic lactone, polycondensation product of hydroxycarboxylic acid, and polycondensation product of dibasic acid and glycol, and specifically includes polyethylene terephthalate resin, polypropylene terephthalate resin, polytrimethylene terephthalate resin, poly butylene terephthalate resin, polyethylene naphthalate resin, polybutylene naphthalate resin, polycyclohexanedimethylene terephthalate resin, polyethylene-1,2-bis(phenoxy)ethane-4,4'-dicarboxylate resin, polyethylene-1,2-bis(phenoxy)ethane-4,4'-dicarboxylate resin, copolymer such as polyethylene isophthalate/terephthalate resin, polybutylene terephthalate/isophthalate resin, polybutylene terephthalate/decanedicarboxyate resin and polycyclohexanedimethylene terephthalate/isophthalate resin, and mixtures thereof.

The poly(phenylenesulfide) resin used in the present invention is a polymer that contains at least 70% by mole and preferably at least 90% by mole of the unit represented by the following chemical formula.

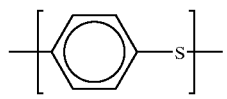

Also, it is possible to constitute less than 30% of the unit with the structural unit represented in the following chemical formulas.

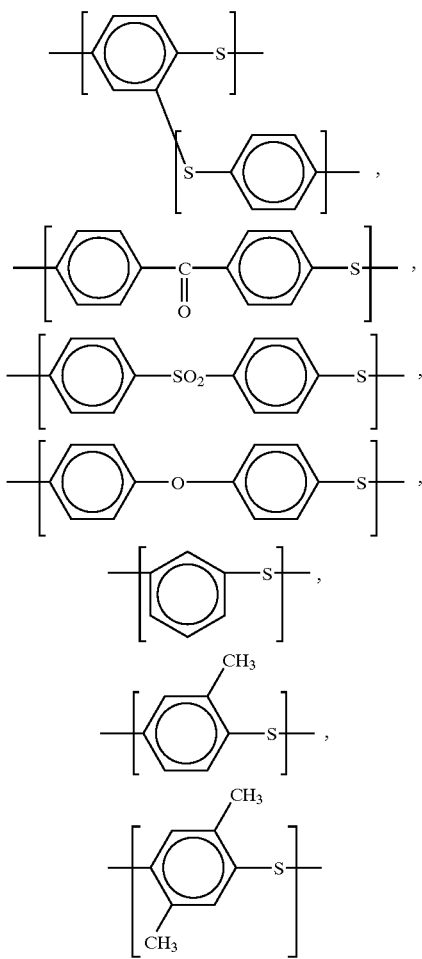

Although there is no particular limitation on the melt viscosity of these PPS resin provided that melt blending is possible, it preferably ranges from 10 to 50,000 poise (300° C., shear rate 1,000/sec) and particularly preferably from 10 to 5,000 poise.

Polyolefine resin such as polyethylene and polypropylene; and liquid crystal polymers such as liquid crystal polyester polymer can be preferably used.

To improve flame retardancy, moldability and outer surface appearance of the carbon fiber reinforced resin composition of the present invention, it is preferable to blend the resin with a phenolic resin. The phenolic resin is one prepared by homopolymerzing or copolymerizing components containing at least phenolic hydroxyl group. For example, phenolic resin (phenolnovolak, cresolnovolak, octylphenol, phenylphenol, naphtholnovolak, phenolaralkyl, naphtholaralkyl, phenolresol and the like) or modified phenolic resin (alkylbenzene modified (especially, xylene modified) phenolic resin, cashew modified phenolic resin, terpene modified phenolic resin and the like) can be included. In view of flame retardancy, the preferred phenolic polymer includes phenolnovolak resin, phenolaralkyl resin and the like. When large amounts of component (B) are used, however, it is preferable to combine the following phenolic resin in view of moldability or outer surface appearance.

The phenolic resin is prepared by condensation reaction of a phenol or a substitute derivative thereof (precursor a) and a hydrocarbon having two double bonds (precursor b). A phenol substituted with 1 to 3 groups selected from alkyl, halogen and hydroxyl at the benzene nucleus is preferably used for precursor a. Specifically, cresol, xylenol, ethylphenol, butylphenol, t-butylphenol, nonylphenol, 3,4,5-trimethylphenol, chlorophenol, bromophenol, chlorocresol, hydroquinone, resorcinol, orcinol and the like can be used. One or at least two of these can be combined. Particularly, phenol and cresol are preferably used.

Aliphatic hydrocarbons such as butadiene, isoprene, pentadiene, and hexadiene; alicyclic hydrocarbons such as cyclohexadiene, vinylcyclohexene, cycloheptadiene, cyclooctadiene, 2,5-norbornadiene, tetrahydroindene, dicyclopentadiene, monocyclic monoterpene (e.g. dipentene, limonone, terpinolene, terpinene and phellandrene), dicyclic sesquiterpene (e.g. cadinene, selinene and caryophyllene) and the like can be used for precursor b. One or at least two of these can be combined. Particularly, monocyclic monoterpene and dicyclopentadiene are preferably used.

The amount of phenolic polymer to be added ranges preferably from 0.1 to 10% by weight and more preferably from 1 to 8% by weight based on 100% by weight of the carbon fiber reinforced resin composition.

The carbon fiber resin composition of the present invention can contain additional component (D), carbon powder to obtain higher conductivity in an easy and cheap manner. The amount of component (D) to be added ranges preferably from 0.1 to 10% by weight and more preferably from 1 to 8% by weight based on 100% by weight of the resin composition in view of mechanical properties. The carbon powder includes, for example, carbon black, amorphous carbon powder, natural graphite powder, artificial graphite powder, expanded graphite powder, pitch micro bead and the like. Among these, carbon black is preferable because it is cheap and efficient. For the carbon black, furnish black, acetylene black, thermal black, channel black and the like can be used, and mixtures containing at least two thereof can also be used. In collective view of supply, price and ability to provide conductivity, the furnish black is preferable, which is cheap and effective at providing conductivity.

The preferred carbon black to achieve the balance between good conductivity and moldability has a specific raman spectrum, as suggested in Japanese Patent Laid-open publication No. (Hei) 11-329078. The ratio of the raman scattering intensity (I2/I1), with I1 being the maximum value of raman band occurring near the raman shift of 1360 cm$^{-1}$ and I2 being the minimum value of raman band occurring near the raman shift of 1500 cm$^{-1}$, ranges preferably from 0.4 to 0.8, more preferably from 0.50 to 0.77, and particularly preferably from 0.65 to 0.75.

The I2/I1 relates to the scattering intensity of raman band after baseline correction. The baseline correction is to correct slope of the measured baseline after a linear approximation of the baseline of the raman spectrum in the raman shift range of 600 to 2200 cm$^{-1}$ and then using the distance from the approximated line as the raman scattering intensity.

If the maximum value of raman band occurring near the raman shift of 1580 cm$^{-1}$ is taken as I3, the standard for the more preferred carbon black is that the intensity ratio of the raman band I1:I2:I3 ranges from 1.3 to 2.1:1:1.5 to 2.5, more preferably from 1.3 to 2.0:1:1.5 to 2.2, and particularly preferably from 1.40 to 1.55:1:1.60 to 1.75.

The raman spectrum is measured by laser raman spectroscopy. The raman spectrum can be measured from the carbon black before blended to resin or the carbon black separated from the resin composition or the molded products therefrom. The former can be measured by macro raman (the diameter of laser spot is about 100 $\mu$m), and the latter can by measured by microscopic raman (the diameter of laser spot is about 5 $\mu$m).

The carbon fiber resin composition of the present invention can contain additional component (E), flame retardant to obtain high flame retardancy. The amount to be added ranges preferably from 0.1 to 30% by weight and more preferably from 1 to 10% by weight based on 100% by weight of the resin composition in view of balance of mechanical properties.

For the flame retardant used in the present invention, well-known flame retardants such as halogen type, phosphorus type, inorganic type and the like can be used without particular limitation. Specifically, halogene type flame retardants such as tetrabromobisphenol A (TBBA) and the derivatives thereof, decabromodiphenylether, bromobisphenol S, tetrabromophthalic anhydride, polydibromophenylene oxide, hexabromocyclododecane, ethylenebistetrabromophthalimide, ethylenebisdibromonorborandicarboxylimide, pentabromodiphenyloxide, tetradecabromodiphenoxybenzene, hexabromobenzene, brominated epoxy type flame retardant, brominated polycarbonate type flame retardant, brominated polyphenyleneoxide type flame retardant, brominated styrene type flame retardant and the like; phosphorus type flame retardants such as red phosphorus, alkylphosphate, allylphosphate, alkylallylphosphate, condensed aromatic phosphoric ester, chlorophosphonitrile derivative, phosphoamide type flame retardant, vinylphosphonate, allylphosphonate, polyphosphoric acid ammonium, polyphosphoric acid amide, melamine phosphate and the like; inorganic flame retardants such as magnesium hydroxide, aluminum hydroxide, barium hydroxide, zinc hydroxide, aluminum hydroxide, zirconium hydroxide, antimony trioxide, antimony tetraoxide, antimony pentaoxide, tin oxide, tin hydroxide, zirconium oxide, molybdenum oxide, titanium oxide, manganese oxide, cobalt oxide, ferrous oxide, ferric oxide, cuprous oxide, cupric oxide, zinc oxide, cadmium oxide, ammonium molybdate, zinc borate, barium borate, calcium aluminate, clay and the like; nitrogen-containing types such as cyanuric acid, isocyanuric acid, melamine, melamine cyanurate, guanidine nitrate and the like; flame retardant aids such as silicone type polymer (polyorganosiloxane and the like), polytetrafluoroethylene (PTFE) and the like can be used. The phosphorus type flame retardant, particularly red phosphorus, is preferable in view of flame retardancy (content of phosphorus) and environmental compatibility.

Because the red phosphorus, used in the red phosphorus type flame retardant, is unstable by itself, and has a tendency to react with water slowly or to be dissolved in water slowly, it is preferable to treat the red phosphorous to prevent these problems. The treatment of the red phosphorus includes making red phosphorous particulate without destroying their surface so that they do not have high reactivity with water or oxygen on their surface as suggested in U.S. Pat. No.5,292,494. The treatment may also include catalytically inhibiting oxidation of the red phosphorus by adding small amounts of aluminum hydroxide or magnesium hydroxide to the red phosphorus; inhibiting contact of the red phosphorous with water by coating the red phosphorus with paraffin or wax; stabilizing the red phosphorous by mixing it with $\epsilon$-carpolactam or trioxane; stabilizing the red phosphorous by coating the red phosphorus with thermosetting resin such as phenolic type resin, melamine type resin, epoxy type resin, unsaturated polyester type resin and the like; stabilizing the red phosphorous by treating the red phosphorus with the solutions of metal salt, such as cupper, nickel, silver, iron, aluminum and titanium and depositing metal phosphorus compound on the surface of the red phosphorus; coating the red phosphorus with aluminum hydroxide, magnesium hydroxide, titanium hydroxide, zinc hydroxide and the like; stabilizing the red phosphorous by electroless plating the surface of red phosphorus with iron, cobalt, nickel, manganese, tin and the like; and combining the above treatments. Among these, it is preferable to make red phosphorous particulate without destroying their surface, to stabilize the red phosphorous by coating the red phosphorus with thermosetting resins such as phenolic type resin, melamine type resin, epoxy type resin, unsaturated polyester type resin and the like, or to combine these two treatments. The most preferred treatment method is to make red phosphorous particulates without destroying their surface so that they do not have high reactivity with water or oxygen on their surface, followed by catalytically inhibiting oxidation of the red phosphorus by adding small amounts of aluminum hydroxide or magnesium hydroxide to the red phosphorus, and, subsequently, to coat the red phosphorous with phenolic thermosetting resin or epoxy thermosetting resin.

For flame retardancy, mechanical properties and inhibition of chemical and physical deterioration of the recycled red phosphorus due to crash of the red phosphorous, the average particle diameter of the red phosphorus before blended to the resin composition ranges preferably from 0.01 to 35 $\mu$m and particularly preferably from 0.1 to 30 $\mu$m.

The average diameter of the red phosphorus can be measured with a general laser diffraction particle size distribution measurement instrument. There are two types of particle size distribution measurement instruments, a wet method and dry method, and either type can be used. In the wet method, water can be used as a dispersion solvent for the red phosphorus. In this case, the surface of the red phosphorus can be treated with an alcohol or a neutral detergent. Furthermore, phosphoric acid salt such as sodium hexametaphosphate and sodium pyrophosphate can be used as a dispersant.

For flame retardancy, mechanical properties, and recycling of the red phosphorus, the amounts of red phosphorous with a diameter not less than 75 $\mu$m is preferably not more than 10% by weight, more preferably not more than 8% by weight, and particularly preferably not more than 5% by weight. The closer to 0% by weight the more preferable, though there is no limitation to the lower limit.

The content of the red phosphorus with diameter not less than 75 μm can be measured by filtering with mesh of 75 μm. The content of the red phosphorus with diameter not less than 75 μm can be calculated from A/100×100 (%), wherein A(g) is the filtered amount of the red phosphorous when 100 g of red phosphorous is filtered with the mesh of 75 μm.

For moisture resistance, mechanical properties, conductivity and recycling of the molded products, conductivity of the red phosphorous extracted from hot water is measured. The values are measured by conductivity meter [Yokokawa Electric Corporation, personal SC meter] from 250 ml of diluted water. The dilution is prepared by the following process: 100 ml of pure water is added to 5 g of the red phosphorus. The solution is extracted, for example in an autoclave, at a temperature of 121° C. for 100 hours. Then, the red phosphorus is filtered from the solution, and the filtrate is diluted to 250 ml. Conductivity ranges preferably from 0.1 to 1000 μS/cm, more preferably from 0.1 to 800 μS/cm, and particularly preferably from 0.1 to 500 μS/cm.

The following additives can be added to the carbon fiber reinforced resin composition of the present invention according to the need in demand: filler (mica, talc, kaoline, sericite, bentonite, xonotlite, sepiolite, smectite, montmorillonite, wollastonite, silica, calcium carbonate, glass bead, glass flake, glass micro balloon, clay, molybdenum disulphide, titanium oxide, zinc oxide, antimony oxide, calcium polyphosphate, graphite, barium sulfate, magnesium sulfate, zinc borate, calcium borate, aluminum borate whisker, potassium titanate whisker, polymer and the like), conductivity providing agent (metallic type, metal oxide type and the like), flame retardant, flame retardant aid, pigment, dye, lubricant, releasing agent, compatibilizer, dispersant, crystallizing agent (mica, talc, kaoline and the like), plasticizer (phosphate ester and the like), thermal stabilizer, antioxidant, anticoloring agent, UV absorbent, flowability modifier, foaming agent, antibacterial agent, dust controlling agent, deodorant, sliding modifier, antistatic agent (polyetheresteramide and the like) and the like. Two or more additives can be combined.

The filler can be swelled by a swelling agent or can be organified by an organification agent. The swelling agent and organification agent are not particularly limited, if they can swell or organify a filler by ion exchange and the like, and include ε-caprolactam, 12-aminododecanoic acid, 12-aminolauric acid, alkyl ammonium salt (dimethyldialkylammonium and the like). Particularly, it is preferred that polyamide resin, polypropylene resin, polyacetal resin, styrenic resin, acrylic resin and the like are blended with the swelled or organified filler (preferably, montmorillonite, mica, saponite, hectorite sepiolite, clay), because the nano-order distribution of the filler is possible, thereby, the desired property can be obtained with small amounts.

The carbon fiber reinforced resin composition or molding compounds of the present invention can be molded with a molding process, such as injection molding (injection compression molding, gas assisted injection molding, insert molding and the like), blow molding, rotary molding, extrusion molding, press molding, transfer molding (RTM molding, RIM molding, SCRIMP molding and the like), filament winding molding, autoclave molding, hand lay-up molding and the like. The most preferred molding process among these is the injection molding with high productivity.

As a form of the molding compounds used in above molding process, pellet, stampable sheet, prepreg, SMC, BMC and the like can be used. The most preferred form of the molding compounds is a pellet, which is used in the injection molding.

The pellet generally defines a material obtained from the following process: melt blending the desired amount of the resin with filler or chopped fiber or continuous filament, and then extruding and palletizing. The melt blending method is not particularly limited, and any machine, which can give mechanical shear to the component (C) under the molten state, such as single extruder, twin extruder or kneader, can be used.

To obtain good conductivity or mechanical properties required for member of electronic devices, it is preferred that the pellet should be a molding compound having a pillar shape. This pillared molding compound (long fiber pellet) enables easy manufacture for aspect ratios larger than that of the conventional known pellet. The pillared molding compound is also advantageous in view of conductivity and mechanical properties of the molded products.

Component (B) is arranged almost parallel to the axial direction (length direction of the molding compounds), and the length of component (B) is substantially equal to the length of the molding compounds. When component (B) is curved, bent or twisted, the length of component (B) can be slightly longer than the length of the molding compounds. The phrase "substantially equal to" includes these cases. If almost equal shape of cross-section of the molding compound is maintained in the axial direction, it can be regarded that the length of component (B) is substantially equal to the length of molding compound.

For handling ease, it is preferred that the pillared molding compounds have a complex structure, wherein structure B that has as main component component (B) and structure A that has as main component component (C) are in contact with each other at one or more points. It is preferred to maintain the complex structure without separating structure A and B when handling the molding compounds. In this complex structure, a gap can exist between the boundaries of structure A and structure B or in the structure B. However, a complex structure with a face of structure A and a face of structure B in contact with each other is preferred in view of the above considerations. A sheath-core structure is particularly preferred to prevent breakup or separation of the bundle of the reinforcing fiber of component (B), wherein structure B is core structure and structure A is sheath structure so that structure A coats around structure B. If the minimum thickness of the coating-layer of structure A of the sheath structure is equal to or above 0.1 mm, the above purpose can be sufficiently achieved.

Component (A) can be contained in any of said structures A and/or B. However, in view of preferred embodiment of the pillared molding compounds, it is preferable that component (A) is contained in structure A.

In view of the optimum balance between mechanical properties and moldability, the length of the pillared molding compounds ranges preferably from 1 to 50 mm, more preferably from 2 to 20 mm, and particularly preferably from 3 to 12 mm. It is preferable to control the thickness of the pillared molding compounds to be from 1 to 10 mm for good handling, although not particularly limited thereto.

It is preferable that the above-mentioned phenolic polymer is contained into structural element (C) to improve the moldability of the pillared molding compounds. Particularly, if some or all of the phenolic polymers are impregnated into structural element (B), the dispersity of structural element (B) is improved. It is also preferable for moldabilty and outer surface appearance. The outer surface appearance defines avoidance of various defects in the surface that results from insufficient dispersion of the reinforcing fibers, wherein the defects include, for instance the phenomena of fiber bundles rising up to the surface or some portions of the molded products expanding.

A preferred embodiment of a process for preparing the pillared molding compounds is illustrated below.

The pillared molding compounds are prepared by at least the following first and second processes.

The first process includes a strandification process comprising melting component A containing at least components (A) and/or (C), and passing at least continuous component (B) therethrough to obtain continuous strand. The method for melting component (A) is not particularly limited and can use any machines, which can provide mechanical shear under the molten state and transfer the molten resin, such as a single extruder, twin extruder and the like. It is preferable to install a vent to remove volatile components of low molecular weight or water vapor generated in this melt blending. It is also preferable to install a plurality of hoppers to add components during the melt blending.

Other components or additives can be blended by melting them simultaneously with or separately from component A and then passing at least continuous (B) therethrough; or by impregnating them into continuous component (B) simultaneously with or separately from phenolic resin of component (C).

The second process includes a cutting process for obtaining the pillared molding compounds by cooling and cutting the continuous strand. The continuous strand is cut to have such length as described above.

The especially preferred method for preparing the pillared molding compounds has the following preliminary process before the first process. The phenolic resin of component (C) is melted and impregnated into component (B) in the preliminary process. From this process, the composite of phenolic resin of component (C) and component (B) is obtained. This composite is passed through the molten component A in the first process to give a continuous strand, which is cooled and cut in the second process.

By going through this preliminary process and forming the composite of components (B) and (C), the time period for the strandification of the first process can be shortened, and the productivity of the molding compounds becomes good. Therefore, the preliminary process is preferable as a process for preparing the molding compounds of the present invention.

The above pellet or long fiber pellet of the present invention can be used solely or combined with one another as molding compounds. They can be mixed with other molding compounds such as other thermoplastic resin, additive and master pellet. They also can be mixed with scraps of molded products or various recycled resins.

Because the molded products of the present invention has good conductivity, the volume resistivity of the molded products is preferably equal to or less than 50 Ω·cm. If the volume resistivity of the molded products is greater than 50 Ω·cm, they may sometimes not be used for application as electromagnetic shielding material. The volume resistivity of the molded products prepared from the molding compounds of the present invention is preferably equal to or less than 30 Ω·cm, more preferably equal to or less than 10 Ω·cm, particularly preferably equal to or less than 1 Ω·cm, and most preferably equal to or less than 0.4 Ω·cm.

It is preferable that the molded products of the present invention have high flame retardancy as well as good conductivity when the molded products are mixed with a flame retardant. It is preferable that the flame retardancy is equal to or better than V-0 under the standard of UL-94 when a specimen with a thickness of not more than 1.6 mm (1/16 inch) is tested. It is more preferable that the flame retardancy is equal to or better than V-0 under the standard of UL-94 when a specimen with a thickness of not more than 0.8 mm (1/32 inch) is tested.

The flame retardancy of V-0 means flame retardancy satisfying the condition of V-0 defined in the standard of UL-94 (combustion test in U.S. designed by Underwriters Laboratories Inc.) with combustion time, occurrence of combustion, occurrence of drip of burned resin, combustibility of the drip and the like. A flame retardancy better than V-0 means flame retardancy showing shorter combustion time than the value defined in V-0 condition or satisfying the condition of V-0 when a specimen of which thickness is thinner than that of the specimen of V-0 is tested.

It is preferable that the molded products of the present invention have improved mechanical properties, particularly high modulus to protect internal electric circuit or internal member because they are used in member of a thin electronic devices. The flexural modulus of the molded products is preferably equal to or greater than 8 GPa, more preferably equal to or greater than 10 GPa, and particularly preferably equal to or greater than 12 GPa when a specimen with the thickness of 6.4 mm and the moisture content of equal to or less than 0.05% is tested under ASTM D790.

The molded products of the present invention are expected to be exposed to harsh conditions when they are used in member of portable electronic devices. Especially, when polyamide resin is used for the molded products, the products have an intrinsic problem of decrease of modulus by moisture absorption. Therefore, for practical mechanical properties, the flexural modulus of the molded products is preferably equal to or greater than 6 GPa, more preferably equal to or greater than 8 GPa, and particularly preferably equal to or greater than 10 GPa when a specimen of 6.4 mm thickness hygroscopically treated in constant temperature and constant-moistened bath of 65° C. and 95% RH for 100 hours is tested under ASTM D790. Wherein, the moisture content depends on the amount of polyamide in the resin composition and generally ranges from 0.5 to 4% by weight. When the specimen is hygroscopically treated, the specimens must not contact with other specimens in the constant temperature and constant-moistened bath. After the hygroscopic treatment, the specimen is kept at room temperature for at least 10 hours so that the moisture content remains. After that, the specimen is used to measure the flexural modulus.

The molded products of the present invention can be used in member of electronic devices, office automation devices, precision devices, and automobiles requiring good conductivity and mechanical properties (particularly, modulus), wherein the member is, for instance, a casing, a cover and a tray. Particularly, the molded products of the present invention can be used for casings of portable electronic devices requiring especially good conductivity (electromagnetic shielding property) and high strength (light weight). More specifically, the molded products of the present invention can be used for casings of large scale display, notebook computers, mobile telephones, PHS, PDA (personal data assistant such as electronic pocketbook), video cameras, video cameras, digital still cameras, portable radio cassette players, inverters and the like.

Because the molded products of the present invention have good conductivity, electric charge/discharge resistance can be provided to the products with the addition of small amounts of carbon fiber. Therefore, they are useful for devices or parts requiring such properties, for example, IC trays, baskets for silicon wafer transfer and parts of entertainment machines having electric circuits such as slot machines (Chassis) and the like.

It is advantageous for the fiber of component (B) contained in the molded products used in the above-mentioned application to be long to achieve good conductivity and mechanical properties. The number average fiber length is preferably at least 200 μm, more preferably at least 250 μm, and particularly preferably at least 300 μm. The number average fiber length is calculated by measuring the length of at least 400 components (B) extracted from the molded products, with an optical microscope or scanning electronic microscope to a 1 μm degree and averaging the measurements. Component (B) can be extracted, for example, by extracting a portion of the molded product, dissolving it in a solvent that dissolves component (C) but not (B) for a period, and separating (B) with a known process such as filtering after component (C) is sufficiently dissolved. The extracted portion should not be taken from and around weld lines, gates, ribs, hinges and edges of the molded products.

It is preferable that the molded products have good electromagnetic shielding property. The electromagnetic shielding property at the frequency of 1 GHz, determined with KEC method, is preferably at least 30 dB, more preferably at least 33 dB, and particularly preferably at least 35 dB.

The KEC method measures the degree of attenuation of the electronic wave with a spectrum analyzer after a specimen is inserted into a shield box that is symmetrically divided up and down or right and left according to the guidelines of KEC Corporation. The specimen can be taken from a plate of appropriate area extracted from a portion of the molded product having electromagnetic shielding property or from molded product made from a plate of appropriate area obtained from the thermoplastic resin composition or model product under the same molding conditions as the molded products having electromagnetic shielding property.

EXAMPLES

The present invention is more specifically illustrated by the following examples. Hereinafter, "%" in the mixing (blending) ratios in examples and comparative examples means % by weight, unless otherwise specified.

The test items and procedures for the molded products composed of molding compounds or carbon fiber reinforced resin composition of the present invention are described below:

[Test procedures to determine the characteristics of the carbon fiber reinforced resin composition]

(1) Volume Resistivity

A specimen of width 12.7 mm×length 65 mm×thickness 2 mm was injection molded so that a gate is positioned at the edge of the width direction. A conductive paste (manufactured by Fujikurakasei Co., Ltd., Dotite) was applied on the width×thickness surface of the molded specimen. After the conductive paste was sufficiently dried, the specimen was measured under absolutely dried condition (moisture content of not more than 0.05%). In measurement, the surface of the width×thickness was pressed to electrodes. The electrical resistance between the electrodes was measured with a digital multimeter (manufactured by Advantest Corporation, R6581). The volume resistivity (unit: Ω·cm) was calculated by subtracting the contact resistance of the measuring devices, jig and the like from the above electrical resistance, multiplying with the applied area of the conductive paste, and dividing with the length of the specimen. In this measurement, 10 samples were measured and averaged.

(2) Flexural Modulus

The flexural modulus (unit: GPa) was evaluated by the flexure test based on ASTM D790 (L/D=16, wherein L is distance between spans and D is thickness). The plate thickness of the specimen was 6.4 mm (¼ inch). The flexural modulus (d) was measured at the moisture content of not more than 0.05%. In this measurement, 5 samples were measured and averaged.

Also, the specimen was hygroscopically treated by standing in a constant temperature and constant-moistened bath at 65° C. and 95% RH for 100 hours. The specimen was kept so that the hygroscopic state was maintained. The flexural modulus (w) was measured according to the above procedure.

(3) Izod Impact Strength

The notched Izod impact strength of the molded products (unit: J/m) was evaluated based on ASTM D256. The thickness of the test specimen was 3.2 mm (⅛ inch). The Izod Impact strength test was performed at the moisture content of not more than 0.05%. In this measurement, 10 samples were measured and averaged.

(4) Flame Retardancy

The flame retardancy was evaluated based on UL-94. The thickness of the tested specimen was 0.8 mm (1/32 inch). The specimen was obtained from injection molding with the film gate extended to a total length of the longer side direction of the specimen.

[Test procedures to determine characteristics of molded products having electromagnetic shielding property]

Figure 7:
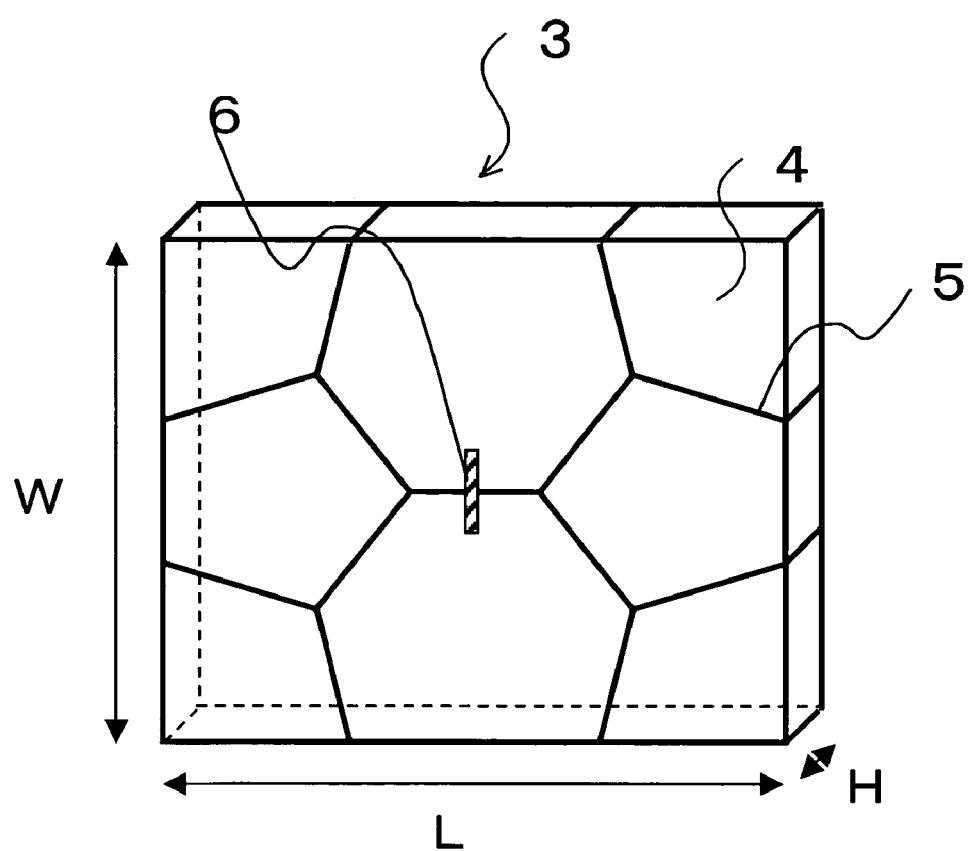
FIG. 7 is a perspective-view of a model casing for electronic devices used in the examples of the present invention.

First, model casing (3) for electronic devices represented in FIG. 7 was molded and tested. The model casing for electronic devices has an upper surface (4) of length (L) 190 mm×width (W) 155 mm and height (H) of 12 mm, with at least 70% of the thickness of the upper surface being about 1.0 mm. Because the specimen was molded with 8 gate points in the injection molding, the weld line (5) represented in FIG. 7 was obtained. Among them, the weld line positioned at the center of the upper surface had the maximum height.

(5) Moldability

Moldability (unit: MPa) was evaluated with the injection pressure measured when the model casing for electronic devices was injection molded. The lower the injection pressure, the better the moldabilty.

(6) Number Average Fiber Length

About 1 g was cut from the upper surface of the model casing for electronic devices and dissolved in 100 cc of formic acid. The solution was left alone for 12 hours. After component (C) PA was absolutely dissolved, it was filtered through filter paper. The filtered residue was observed with a microscope. The fiber length of 400 components (B), which was randomly extracted, was measured to calculate the number average fiber length.

(7) Electromagnetic Shielding Property

Electromagnetic shielding property was tested with the KEC method (unit: db). A portion of the center of the upper surface of the model casing (3) for electronic devices was cut to prepare a specimen of 120 mm×120 mm. In the test, the specimen was made to absolutely dried state (moisture content of not more than 0.05%), four sides of the specimen were coated with the conductive paste (manufactured by Fujikurakasei Co., Ltd., Dotite) and sufficiently dried. The electromagnetic shielding property was measured at the frequency of 1 GHz with a spectrum analyzer. The more the shielded electromagnetic waves, the better the electromagnetic shielding property.

(8) Outer Surface Appearance

The maximum height (Ry) in the measurement range (6) of the outer surface appearance of the model casing for electronic devices, represented in FIG. 7, was evaluated based on JIS B0601 (unit: μm). The outer surface appearance was evaluated at a region that did not contain the trace of a gate and rib and was perpendicular to the center weld line of the upper surface of the model casing for electronic devices at one point under the condition of test length of 3.00 mm and cut-off value of 0.25 mm. Surf Tester 301 manufactured by Mitutoyo Corporation was used as the test device. The lesser the Ry value, the better the outer surface appearance.

Finally, the balance of the conductivity, the mechanical properties, the moldability and the outer surface appearance in the above test items was synthetically assessed with a category of 5 states of OOO: excellent, OO: very good, O: good, Δ: not good and X: bad.

Each component used in the examples and the comparative examples of the present invention are as follows:

Component (A)

NT: Vapor grown multi-layer nanotube manufactured by Hyperion Catalysis International. [average diameter of single fiber=about 15 nm]

Component (B)

CF1: Chopped fiber 48 (X8) manufactured by Zoltek Companies, Inc. [average diameter of single fiber=7 μm]

CF2: PAN type carbon fiber T700SC-12K manufactured by Toray Industries, Inc. [average diameter of single fiber=7 μm]

Component (C)

PC: Polycarbonate resin LEXAN 121R manufactured by Japan GE Plastics.

PA1~3: Polyamide resins used in the present invention. The composition ratio and relative viscosity $\eta_r$ of the polyamide resins are shown in Table 1. The polyamide resins were prepared as follows:

The equimolar salt of hexamethylenediamine and adipic acid, the equimolar salt of hexamethylenediamine and isophthalic acid and ε-caprolactam were added according to the weight ratio described in Table 1. The same amount of pure water as that of the added total materials was added to the mixture. The reaction vessel was sufficiently purged with nitrogen and heated with stirring. While the pressure in the vessel was controlled up to 20 kg/cm², the final temperature was set to 270° C. The polymer, extruded with bath, was pelletized with a strand cutter.

PA4: Nylon resin CM1001 manufactured by Toray Industries, Inc.

PA5: Polyamide 66 homopolymer prepared by polymerizing the equimolar salt of hexamethylenediamine and adipic acid according to the same procedure as that of PA1 to 4.

TABLE 1

| Resin composition (% by weight) | PA1 | PA2 | PA3 | PA4 | PA5 |
|---|---|---|---|---|---|
| (pa1) equimolar salt of hexamethylenediamine and adipic acid | 76 | 86 | 90 | 100 | 0 |
| (pa2) equimolar salt of hexamethylene-diamine and isophthalic acid | 16 | 4 | 10 | 0 | 100 |
| (pa3) ε-caprolactam | 8 | 10 | 0 | 0 | 0 |
| Ration of (pa2)/(pa3) by weight | 2.00 | 0.40 | — | — | — |
| Relative viscosity $\eta_r$ (determination of viscosity in 98% sulfuric acid) | 2.30 | 2.30 | 2.35 | 2.35 | 2.40 |

PH: Terpen phenolic resin YP-90L manufactured by Yasuhara Chemical Co., Ltd.

Component (D)

CB: Carbon black [average particle diameter=55 nm, DBP absorbing amount=130 cm³/100 g]

Component (E)

RP: Red phosphorus Novaexcel 140 manufactured by Rinkagakukogyo Co., Ltd.

Other Components

VG1: Vapor grown carbon fiber manufactured by Applied Science Inc. [average diameter of single fiber=about 150 nm]

VG2: Vapor grown carbon fiber manufactured by Showa Denko K. K. [average diameter of single fiber=about 50 nm]

Also, components (A), (D), (E) and (F) were used in a master pellet, which was prepared by pre-blending each component (A), (D), (E) and (F) with component (C). Specifically, the master pellet was prepared by sufficient melting and blending desired amounts of each component and component (C) sufficiently dried to a moisture content of not more than 0.05% with a twin extruder.

Example 1 and Comparative Examples 1 to 4

Desired amounts of master pellets of the components (A) and (F), which were sufficiently dried to the moisture content of not more than 0.05%, and component (C) was added to the main hopper of a twin extruder. While components (A), (F) and (C) were extruded in a sufficient molten and blended state, component (B) CF1 with moisture content of not more than 0.05% was added through a side hopper and mixed. The obtained gut containing discontinuous carbon fiber was cooled, and cut to give a pellet of 5 mm.

Each component, other components, and blending ratio thereof are shown in Table 2. The obtained pellet was dried in vacuum at 100° C. for at least 5 hours. And then, this was injection molded with a J150EII-P type injection molder manufactured by Japan Steel Works, Ltd. with the barrel temperature at 320° C. and the molder temperature at 80° C. to give each specimen. After molding, the specimen was dried in vacuum at 80° C. for 12 hours, stored in a desiccator at room temperature for 3 hours, and used in the test. The test results are shown in Table 2.

TABLE 2

| Resin composition (% by weight) | Example | Comparative Example | | | |
|---|---|---|---|---|---|
| | 1 | 1 | 2 | 3 | 4 |
| Component (A) NT | 0.5 | — | 3.0 | — | — |
| Component (B) CF1 | 30.0 | 30.0 | 30.0 | 30.0 | 30.0 |

TABLE 2-continued

| Resin | Example | Comparative Example | | | |
|---|---|---|---|---|---|
| composition (% by weight) | 1 | 1 | 2 | 3 | 4 |
| Component (C) PC | 79.5 | 80.0 | 77.0 | 79.5 | 79.5 |
| Other components | | | | | |
| VG1 | — | — | — | 0.5 | — |
| VG2 | — | — | — | — | 0.5 |
| Characteristics of the molded products | | | | | |
| (1) Volume resistivity (Ω · cm) | 0.25 | 0.44 | 0.42 | 0.45 | 0.43 |
| (2) Flexural modulus (d) (GPa) | 16.1 | 15.3 | 16.2 | 15.3 | 15.4 |
| (3) Izod impact strength (J/m) | 56 | 52 | 42 | 48 | 45 |
| Synthetic evaluation | ○ | X | X | X | X |

From the results in Table 2, the following conclusions are made.

Example 1, in which an amount of component (A) as defined in the present invention was used, provided good conductivity and a lower volume resistivity compared with comparative example 1. However, comparative example 2, in which an amount of component (A) in excess of what is defined by the present invention was used, could not provide molded products having good balance between the impact strength and the conductivity.

Also, Example 1 provided molded products having remarkably good conductivity and impact strength when compared with comparative Examples 3 and 4. Vapor grown multi-layer nanotube with average single fiber diameter of about 15 nm was used in Example 1, which is within the range defined by the present invention. Vapor grown carbon fiber with average diameter of single fiber of about 150 nm or about 50 nm, which is outside the range defined by the present invention, was used in comparative Examples 3 and 4.

Examples 2 to 5 and Comparative Examples 5 to 8

Master pellet in a sufficiently molten and blended state was extruded through a crosshead die attached to the front side of a single extruder. At the same time, a bundle of continuous fiber shape component (B) CF2, dried to the water content of not more than 0.05%, was also supplied to the crosshead die. Each component including components (A) and (C) were coated on component (B). Herein, a crosshead die means a device that opens the bundle of continuous fibers and impregnates molten resins into them. The resulting strand containing the bundle of continuous fiber shape component (B) was cooled and cut with a cutter to provide a long fiber pellet of 7 mm.

Examples 6 to 12

The continuous fiber bundle of component (B) CF2 was opened at 200° C. with heating. The sufficiently molten component (C) PH was metered with a gear pump and coated on the continuous fiber of the component (B) with a coater. Further, the fiber bundle was passed through 10 rolls ($\phi$: 50 mm) at 180° C., which was alternatively positioned up and down in line, to sufficiently impregnate the component (C) PH into the bundle of component (B).

Then, while the master pellet, which was in a sufficiently molten and blended state, was extruded through the crosshead die attached to the front side of single extruder, the continuous fiber bundle was supplied to the crosshead die to coat each component of the master pellet on the continuous fiber bundle.

The resulting strand containing the bundle of continuous fiber shape component (B) was cooled and cut with a cutter to give a long fiber pellet of 7 mm. The production of such long fiber pellet was continuously performed in on-line.

The master pellet was blended with the obtained pellet of which components and amounts thereof are shown in Table 3 to give the molding compounds.

Each component, other components and the blending ratio are shown in Tables 3 and 4. After the obtained pellet was dried in vacuum at 80° C. for at least 5 hours in a similar manner, it was injection molded at cylinder temperature of 280° C. and molder temperature of 70° C. and used in the test. The test results are shown in Tables 3 and 4.

TABLE 3

| | Example | | | | Comparative Example | | | |
|---|---|---|---|---|---|---|---|---|
| Resin composition (% by weight) | 2 | 3 | 4 | 5 | 5 | 6 | 7 | 8 |
| Component (A) NT | 0.5 | 0.1 | 0.2 | 0.6 | — | 3.0 | — | — |
| Component (B) CF2 | 20.0 | 20.0 | 20.0 | 20.0 | 20.0 | 20.0 | 20.0 | 20.0 |
| Component (C) PA1 | 79.5 | 79.8 | 79.3 | 79.3 | 80.0 | 78.0 | 79.5 | — |
| Other Components | | | | | | | | |
| VG1 | — | — | — | — | — | — | 0.5 | — |
| VG2 | — | — | — | — | — | — | — | 0.5 |
| Characteristics of molded products | | | | | | | | |
| (1) Volume resistivity (Ω · cm) | 0.24 | 0.28 | 0.25 | 0.31 | 0.43 | 0.41 | 0.42 | 0.43 |
| (2) Flexural modulus (d) (GPa) | 13.7 | 13.2 | 13.4 | 13.7 | 12.4 | 14.2 | 13.2 | 13.0 |
| (3) Izod impact strength (J/m) | 166 | 161 | 165 | 164 | 159 | 144 | 146 | 145 |
| Synthetic evaluation | ○ | ○ | ○ | ○ | Δ | Δ | X | X |

From the results in Table 3, the following conclusions are made.

Although components (B) and (C) were changed, the same results as that in Table 2 were obtained. Examples 2 to 5 could lower the volume resistivity and provide good conductivity compared with Comparative Example 5, wherein such amount of component (A) as suggested in the present invention was used in Examples 2 to 5. However, Comparative Example 6, in which excess amount of component (A) than that suggested in the present invention was used, could not provide molded products having good balance between the impact strength and the conductivity.

Also, Examples 2 to 5 could provide molded products having remarkably good conductivity and impact strength compared with Comparative Examples 7 and 8. Vapor grown multi-layer nanotube with average diameter of single fiber of about 15 nm, which is within the range defined by the present invention, was used in Examples 2 to 5, and vapor grown carbon fiber with average diameter of single fiber at about 150 nm or about 50 nm, which are outside the ranges defined by the present invention, was used in Comparative Examples 7 and 8.

of mechanical properties in moisturized state and good outer surface appearance over those of Examples 8 to 10.

Example 11, in which component (D) was blended, can provide higher conductivity than Example 6. Therefore, it is more particularly preferable embodiment of the present invention.

Example 12, in which component (E) was blended, achieved flame retardancy of V-0 according to UL-94 without deterioration of the balance between conductivity and mechanical properties. Therefore, it is more particularly preferable for member of electronic devices, office automation devices and the like.

INDUSTRIAL APPLICABILITY

The present invention can provide carbon fiber reinforced resin composition having good conductivity, mechanical

TABLE 4

| Resin composition (% by weight) | Example | | | | | | |
|---|---|---|---|---|---|---|---|
| | 6 | 7 | 8 | 9 | 10 | 11 | 12 |
| Component (A) NT | 0.2 | 0.2 | 0.2 | 0.2 | 0.2 | 0.2 | 0.2 |
| Component (B) CF2 | 20.0 | 20.0 | 20.0 | 20.0 | 20.0 | 20.0 | 20.0 |
| Component (C) | | | | | | | |
| PA1 | 74.8 | — | — | — | — | 72.8 | 67.8 |
| PA2 | — | 74.8 | — | — | — | — | — |
| PA3 | — | — | 74.8 | — | — | — | — |
| PA4 | — | — | — | 74.8 | — | — | — |
| PA5 | — | — | — | — | 74.8 | — | — |
| PH | 5.0 | 5.0 | 5.0 | 5.0 | 5.0 | 5.0 | 5.0 |
| Component (D) CB | — | — | — | — | — | 2.0 | 2.0 |
| Component (E) RP | — | — | — | — | — | — | 5.0 |
| Characteristics of molded products | | | | | | | |
| (1) Volume resistivity ($\Omega \cdot cm$) | 0.22 | 0.20 | 0.20 | 0.21 | 0.20 | 0.12 | 0.12 |
| (2) Flexural modulus (d) (GPa) | 14.3 | 14.2 | 14.3 | 14.0 | 13.9 | 14.6 | 15.4 |
| Flexural modulus (w) (GPa) | 10.2 | 10.1 | 10.1 | 8.2 | 8.0 | 10.4 | 11.2 |
| (3) Izod impact strength (J/m) | 158 | 162 | 155 | 157 | 146 | 153 | 155 |
| (4) Flame retardancy (UL-94) | — | — | — | — | — | — | V-0 |
| Characteristics of model casing | | | | | | | |
| (1) Injection molding pressure (MPa) | 7.2 | 7.1 | 7.4 | 7.2 | 7.7 | 7.4 | 7.8 |
| (2) Number average fiber length ($\mu m$) | 415 | 420 | 405 | 360 | 345 | 395 | 380 |
| (3) Elecromagnetic shielding property (dB) | 32 | 32 | 33 | 31 | 31 | 35 | 35 |
| (4) Outer surface appearance ($\mu m$) | 3 | 4 | 7 | 9 | 12 | 3 | 3 |
| Synthetic evaluation | ○○ | ○○ | ○ | ○ | ○ | ○○ | ○○○ |

From the results in Table 4, the following conclusions are made.

Examples 6 to 12, in which component (C) was blended with phenolic polymer, was able to maintain the balance of good conductivity, rigidity and impact strength as in Examples 2 to 5 and further prevent the rising of the bundle of carbon fiber in the upper surface of the molded products when the model casing was molded. The molded products of Examples 6 to 12 could make the carbon fiber long even though they were thin. Also, they had electromagnetic shielding property even though they were not plated. Therefore, they are particularly preferable for member of electronic devices, office automation devices and the like.

The molded products of Examples 6 and 7, which used preferred amounts of polyamide resin, were particularly preferable for member of electronic devices, office automation devices and the like, because they had low deterioration properties and moldability. This resin composition and molding compounds can provide light molded products having good conductivity, mechanical properties, outer surface appearance and flame retardancy. Therefore, the present invention can provide molded products that are preferable for various industrial fields, such as casings, trays, etc. for electronic devices, office automation devices, precision machines and automobiles.

What is claimed is:

1. A carbon fiber reinforced resin composition comprising the following essential components (A), (B) and (C):

Component (A): 0.01 to 0.7% by weight of vapor grown carbon fiber and/or nanotubes based on 100% by weight of the carbon fiber reinforced resin composition, of which the average diameter of single fiber ranges from 1 to 45 nm;

Component (B): 6 to 40% by weight of carbon fiber based on 100% by weight of the carbon fiber reinforced resin composition, of which the average diameter of single fiber ranges from 1 to 20 µm; and Component (C): resin comprising at least one selected from the group consisting of polyamide resin, styrenic resin, polycarbonate resin, modified polyphenylene ether resin, polyester resin, poly(phenylenesulfide) resin, polyolefin resin, liquid crystal polymer, phenolic resin and elastomer.

2. The carbon fiber reinforced resin composition according to claim 1, wherein the component (C) comprises at least a polyamide copolymer.

3. The carbon fiber reinforced resin composition according to claim 2, wherein the polyamide copolymer is composed of the following unit structure:

(pa1) 60 to 90% by weight of hexamethylenediamineadipamide;
(pa2) 1 to 30% by weight of hexamethyleneisophthalamide; and
(pa3) 1 to 10% by weight of caproamide; and the weight ratio of (pa2)/(pa3) is 1 to 30.

4. The carbon fiber reinforced resin composition according to claim 3, wherein the relative viscosity $\eta_r$ (determination of viscosity in 98% sulfuric acid) of the polyamide copolymer ranges from 1.5 to 2.5.

5. The carbon fiber reinforced resin composition according to claim 1, further comprising a carbon powder as a component (D).

6. The carbon fiber reinforced resin composition according to claim 5, wherein the carbon powder is carbon black.

7. The carbon fiber reinforced resin composition according to claim 1, further comprising a flame retardant as a component (E).

8. The carbon fiber reinforced resin composition according to claim 7, wherein the flame retardant is red phosphorus.

9. Molding compounds with a pellet shape, consisting of the carbon fiber reinforced resin composition described in claim 1.

10. The molding compounds according to claim 9, wherein said molding compounds have a pillar shape, wherein component (B) is arranged almost parallel to an axial direction of the molding compounds, and the length of component (B) is substantially equal to the length of the molding compounds.

11. The molding compounds according to claim 10, having a sheath/core structure wherein the periphery of structure B is coated with structure A.

12. The molding compounds according to claim 9, wherein the pellet is a long fiber pellet.

13. Molding compounds made by blending the molding compounds described in claim 9 with other molding compounds.

14. A molded product made from the carbon fiber reinforced resin composition described in claim 1 or the molding compounds described in claim 9.

15. The molded product according to claim 14, wherein the molded product is made by injection molding.

16. The molded product according to claim 14, having volume resistivity of not more than 50 Ω·cm.

17. The molded product according to claim 14, wherein the flame retardancy for the thickness of not more than 1.6 mm (1/16 inch) under UL-94 is equal to or better than V-0.

18. The molded product according to claim 14, wherein the flexural modulus for the specimen having thickness of 6.4 mm and moisture content of not more than 0.05% under ASTM D790 is at least 8 GPa.

19. The molded product according to claim 14, wherein the flexural modulus for a specimen having thickness of 6.4 mm, which is hygroscopically treated in a constant temperature and constant-moistened bath at 65° C. and 95% RH for 100 hours, under ASTM D790 is at least 6 GPa.

20. The molded product according to claim 14, wherein the molded product is a casing, a cover, a tray or parts thereof for an electronic device, an office automation device, a household appliance, or an automobile.

21. The molded product according to claim 20, wherein the number average fiber length of component (B) is at least 200 µm, and the electromagnetic shielding property at the frequency of 1 GHz measured with the KEC method is at least 30 dB.

* * * * *